(12) United States Patent
Beber et al.

(10) Patent No.: US 10,287,068 B2
(45) Date of Patent: May 14, 2019

(54) FLOW RESTRICTOR ASSEMBLY

(71) Applicant: WHIRLPOOL CORPORATION, Benton Harbor, MI (US)

(72) Inventors: Kevin J. Beber, Granger, IN (US); Daniel F. Galea, St. Joseph, MI (US); Joseph Snyder, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 15/727,811

(22) Filed: Oct. 9, 2017

(65) Prior Publication Data

US 2018/0099793 A1    Apr. 12, 2018

Related U.S. Application Data

(60) Provisional application No. 62/407,252, filed on Oct. 12, 2016.

(51) Int. Cl.
| | |
|---|---|
| *B65D 47/30* | (2006.01) |
| *A47J 31/00* | (2006.01) |
| *B65D 47/06* | (2006.01) |
| *A47J 27/21* | (2006.01) |

(52) U.S. Cl.
CPC ....... *B65D 47/305* (2013.01); *A47J 27/21191* (2013.01); *A47J 31/00* (2013.01); *B65D 47/06* (2013.01)

(58) Field of Classification Search
CPC .. B65D 47/305; B65D 47/06; A47J 27/21191; A47J 31/00

USPC .......................................... 222/559, 561, 572
See application file for complete search history.

(56) References Cited

U.S. PATENT DOCUMENTS

| | | | |
|---|---|---|---|
| D27,371 S | 3/1860 | Magee | |
| 62,697 A * | 3/1867 | Simons | A47J 31/14 222/189.07 |
| D62,697 S | 3/1867 | Simons | |
| 2,592,279 A | 4/1952 | Heier | |
| 3,730,403 A * | 5/1973 | Piagnoli | A47J 27/56 222/572 |
| 5,672,274 A | 9/1997 | Wheeler et al. | |
| 6,383,381 B1 | 5/2002 | O'Flynn et al. | |
| 6,911,146 B2 | 6/2005 | Melgaard et al. | |
| 7,048,144 B1 | 5/2006 | Chan et al. | |
| 9,307,852 B2 | 4/2016 | Steininger | |
| 2003/0019889 A1 | 1/2003 | Lebowitz | |

FOREIGN PATENT DOCUMENTS

| | | |
|---|---|---|
| GB | 2305353 A | 4/1997 |
| GB | 2319952 A | 6/1998 |

* cited by examiner

*Primary Examiner* — Donnell A Long
(74) *Attorney, Agent, or Firm* — Price Heneveld LLP

(57) ABSTRACT

A flow restrictor assembly for a beverage kettle having a valve member that moves with respect to an opening in the interior of the beverage kettle to restrict the flow of liquid from the opening in the beverage kettle. The valve member may be coupled to a handle that enables movement of the valve member into varying positions with respect to the opening to control the flow rate.

20 Claims, 16 Drawing Sheets

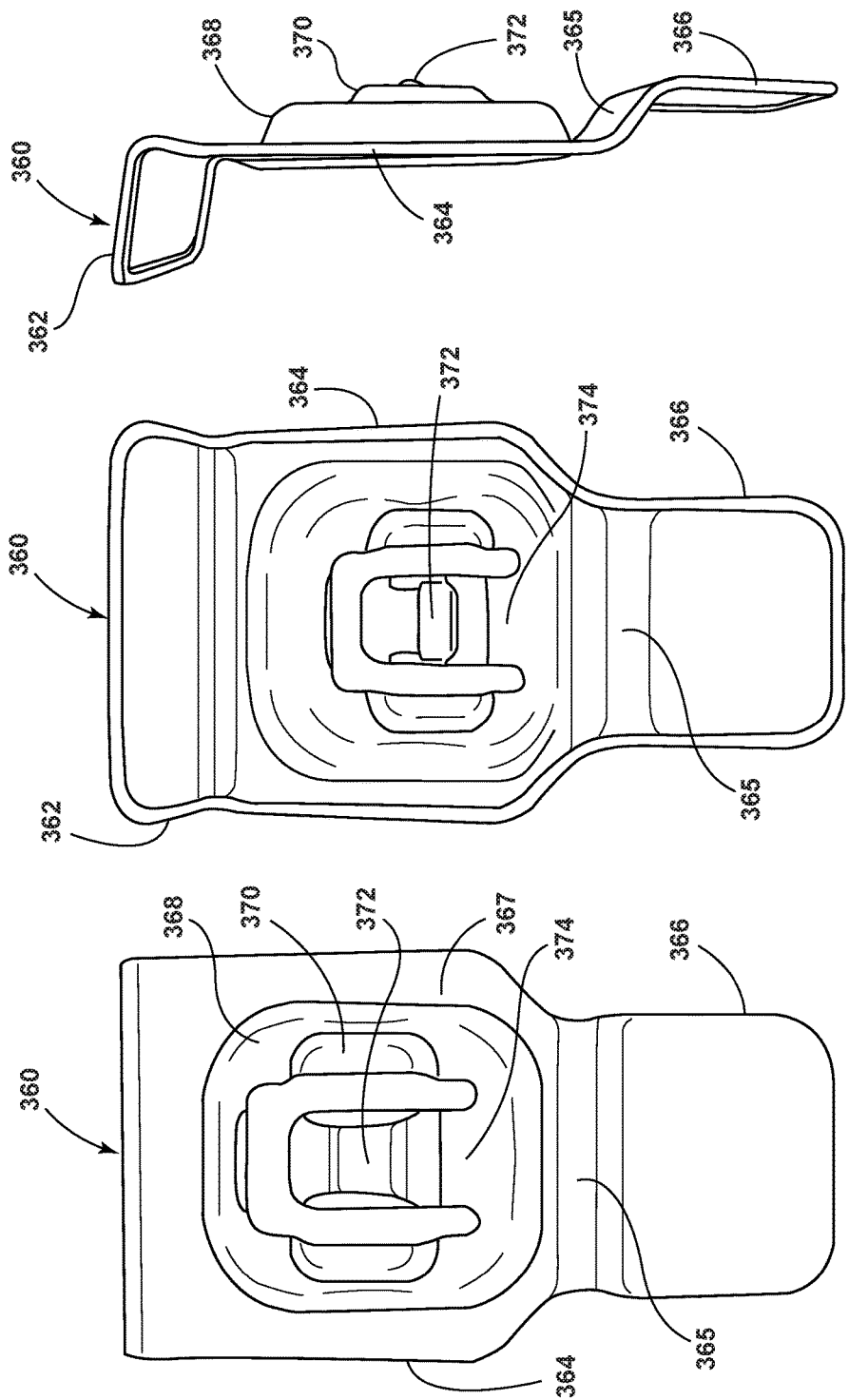

FLOW RESTRICTOR ASSEMBLY

CROSS-REFERENCE TO RELATED APPLICATIONS

This application claims priority to and the benefit under 35 U.S.C. § 119(e) of the U.S. Provisional Patent Application No. 62/407,252, filed Oct. 12, 2016, entitled "FLOW RESTRICTOR ASSEMBLY," the entire disclosure of which is incorporated herein.

TECHNICAL FIELD

The present disclosure generally relates to flow restrictor assemblies for beverage dispensers.

SUMMARY OF THE INVENTION

According to one aspect, a flow restrictor assembly for a beverage kettle is disclosed. The beverage kettle defines a cavity for holding a liquid and includes an opening for dispensing liquid from the cavity. The flow restrictor assembly comprises a valve member positioned inside the cavity and a handle operably coupled with the valve member to selectively position the valve member in one of a first position or a second position with respect to the beverage kettle opening. Additionally, the assembly includes a biasing member configured to hold the valve member in one of the first position or the second position, wherein the valve member covers at least a portion of the opening in the first position.

In other aspects, a beverage kettle comprises a cavity for holding a liquid, a spout for dispensing the liquid from the cavity, and a flow restrictor assembly. The cavity includes a bottom surface, a side wall, and a top opening, and the spout is disposed at an opening in the side wall. The flow restrictor assembly comprises a valve member positioned inside the cavity and a handle operably coupled with the valve member to selectively position the valve member in one of a first position or a second position with respect to the opening in the side wall. The valve member is configured to partially cover the opening in the side wall in the first position. Further, rotation of the handle causes the valve member to move from the first position to the second position.

In still other aspects, another flow restrictor assembly for a beverage kettle is disclosed. The beverage kettle defines a cavity for holding a liquid and includes an opening for dispensing liquid from the cavity. The flow restrictor assembly comprises a valve member positioned inside the cavity. The valve member is movable between a first position and a second position with respect to the opening. The flow restrictor assembly further comprises a structure for supporting the valve member, wherein side portions of the structure each define a channel for engaging side portions of the valve member. Additionally, a biasing arm extends from the valve member and is configured to hold the valve member in one of the first position or the second position.

These and other features, advantages, and objects of the present disclosure will be further understood and appreciated by those skilled in the art by reference to the following specification, claims, and appended drawings.

BRIEF DESCRIPTION OF THE DRAWINGS

The foregoing summary, as well as the following detailed description, will be better understood when read in conjunction with the appended drawings. It should be understood, however, that the disclosure is not limited to the precise arrangements and instrumentalities shown. In addition, the appended drawings are not necessary drawn to scale, and certain features may be exaggerated in scale or shown in schematic form in the interest of clarity and conciseness.

FIG. 12 depicts a front elevational view of another portion of the flow restrictor assembly depicted in FIG. 10;

FIG. 13 depicts a rear elevational view of another portion of the flow restrictor assembly depicted in FIG. 10; and FIG. 14 depicts a side elevational view of another portion of the flow restrictor assembly depicted in FIG. 10.

DETAILED DESCRIPTION

Figure 1:
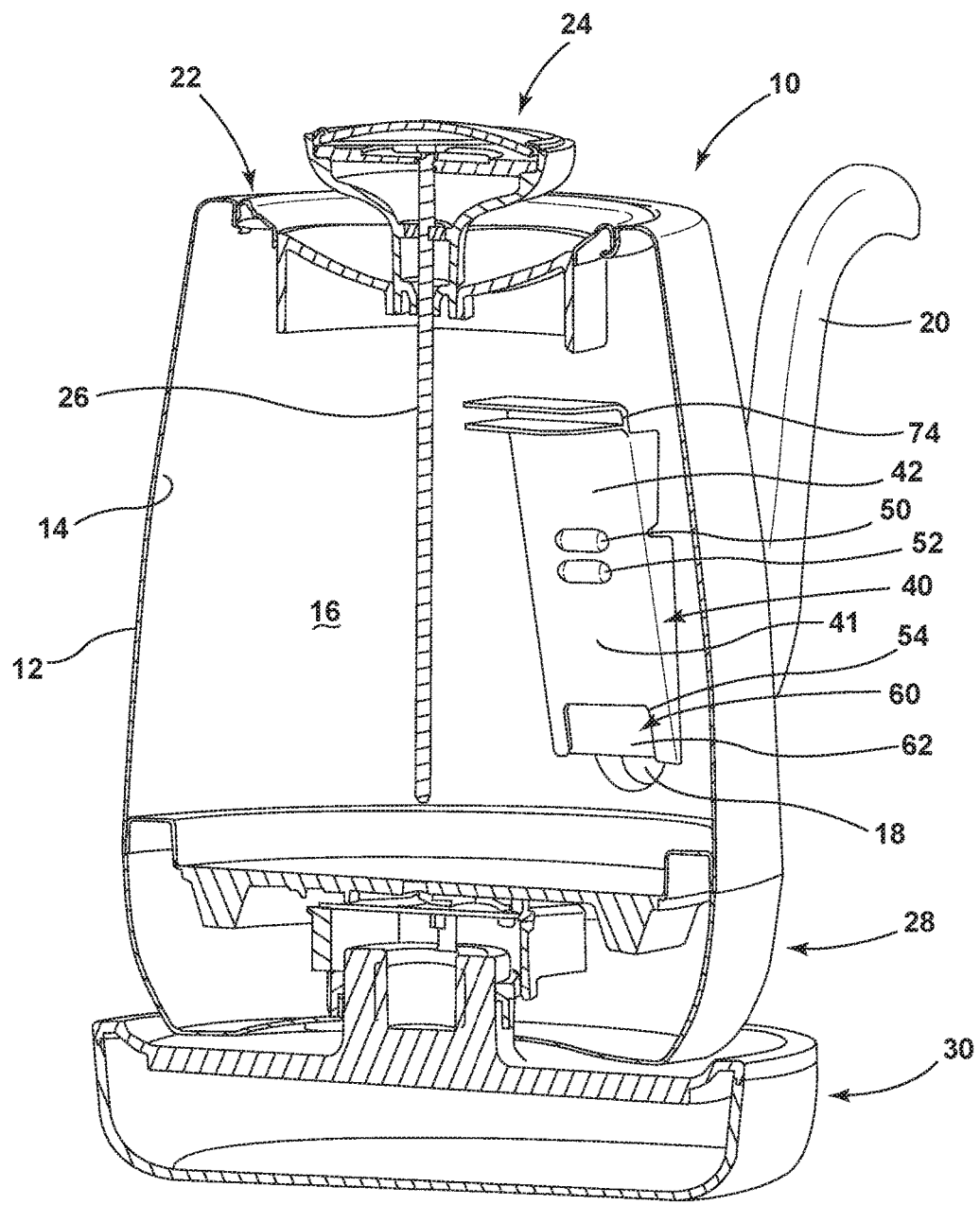
FIG. 1 depicts a cross-sectional view of a beverage kettle having a flow restrictor assembly, according to an embodiment of the present disclosure.
Figure 2:
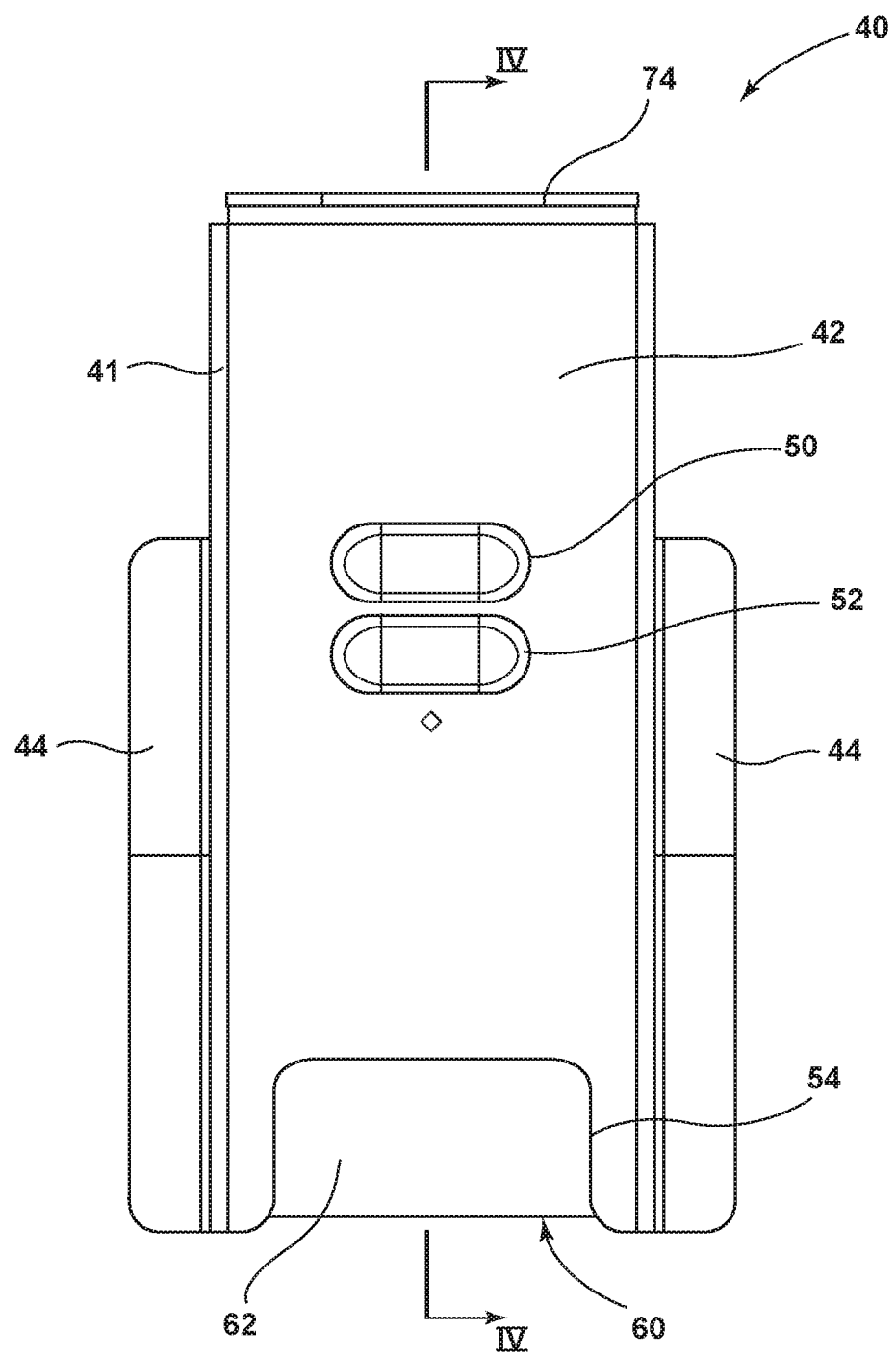
FIG. 2 depicts an elevational view of the flow restrictor assembly of FIG. 1.

Beverage dispensing devices, such as beverage kettle 10 depicted in FIG. 1, may be used for dispensing liquids of variable temperatures for a variety of purposes. For example, in some cases, a dispensing device may be used to dispense cold or tepid liquids for consumption. In other cases, such devices may be used to heat and dispense liquid, such as water, for making tea, coffee, or other hot mixed beverages. In some cases, it may be desirable to control how fast a liquid flows out of the dispensing device to prevent excess splashing or inadvertent spill-over. It also may be desirable to control the amount of liquid that is dispensed from a dispensing device. Referring to an embodiment depicted in FIG. 1, aspects of the present disclosure provide a flow restrictor assembly 40 for variably restricting the flow of a beverage from a dispensing device, such as beverage kettle 10.

For purposes of description herein, the terms "upper," "lower," "internal," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In addition, for purposes of this disclosure, the term "coupled" (in all of its form, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

FIG. 1 depicts an embodiment of a flow restrictor assembly 40 disposed in a beverage kettle 10. According to aspects of the present disclosure, beverage kettle 10 may generally include an external surface 12 and an interior surface 14 defining a cavity 16 for holding a liquid. As would be generally understood in the art, beverage kettle 10 may further include an opening 18 having a spout 20 disposed thereon for dispensing liquid from the cavity 16. Further, cavity 16 may include a top opening 22 and a lid assembly 24 for closing and/or accessing cavity 16. In at least one case, lid assembly 24 may further include a thermometer 26 integrated therewith for measuring the temperature of a liquid contained in beverage kettle 10. In other cases, lid assembly 24 may include other types of integral devices or instruments, or may be a solid member without separate component integral therewith.

In some cases, beverage kettle 10 may be coupled to a heating and/or cooling element to heat or cool a liquid contained therein, as would be contemplated by a skilled artisan. For example, beverage kettle 10 may include heating or cooling elements in the walls of the kettle itself, or may be coupled to an external device that heats or cools the liquid on contact. In at least one embodiment, beverage kettle 10 may include a base portion 28 that is configured to rest upon and couple with a heating element 30. In other cases, however, beverage kettle 10 may be a standalone device without an integral heating or cooling facility, and still fall within the spirit and scope of the present disclosure.

Beverage kettle 10 may further include provisions to control the flow (i.e., the speed or volume) of liquid exiting cavity 16. For example, beverage kettle 10 may include a valve, gate, screen, or other implement to impact the flow of liquid from cavity 16. In some cases, beverage kettle 10 may include a valve located within cavity 16 and proximate opening 18 to control the flow of a liquid as it is poured out of spout 20. In other cases, however, beverage kettle 10 may include an external device that interacts with the liquid flow out of beverage kettle 10. In at least one embodiment, beverage kettle 10 may include a flow restrictor assembly 40 disposed within cavity 16 to restrict or limit the flow of liquid out of opening 18, and ultimately out of spout 20. According to at least one embodiment described herein, flow restrictor assembly 40 may include a valve member 60 that is movable between variable positions relative to opening 18 to block a portion of opening 18. By blocking a variably sized portion of opening 18, the flow of liquid from cavity 16 through spout 20 may be controlled or restricted.

Figure 3:
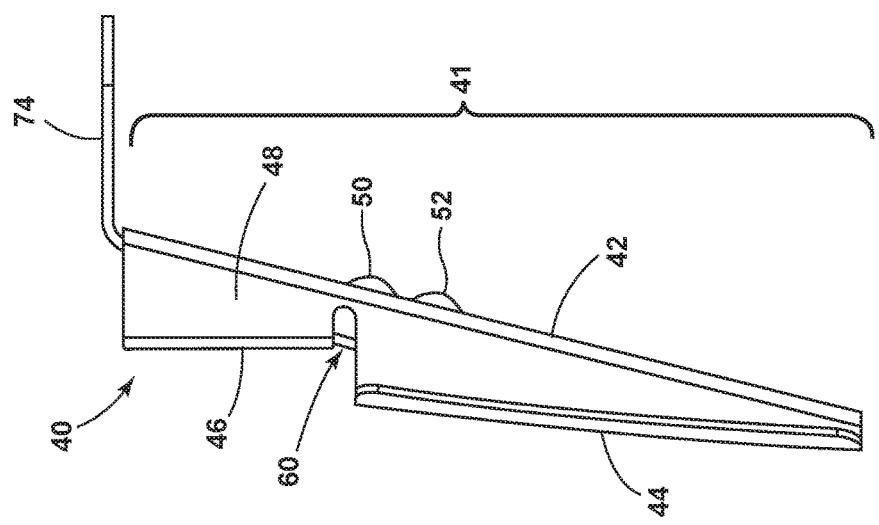
FIG. 3 depicts a side elevational view of the flow restrictor assembly of FIG. 1.

According to an embodiment depicted in FIGS. 1-4C, flow restrictor assembly 40 may include a valve member 60 disposed within a flow restrictor assembly structure 41 (FIG. 3). According to the illustrated embodiment, valve member 60 may comprise an elongated, solid member that is movable within flow restrictor assembly structure 41. Accordingly, as described in more detail below, valve member 60 may be moved up and down with respect to flow restrictor assembly structure 41 into various positions (FIG. 4A-4C) to provide varying levels of flow restriction to opening 18.

As illustrated, in at least one embodiment, flow restrictor assembly structure 41 may include a front cover 42, a back cover 44, and side portions 48. Front cover 42 may comprise a flat member having a cut-out portion or opening 54, also co-located with opening 18 in beverage kettle 10. Back cover 44 may also comprise a flat member coupled with or otherwise fixedly attached to interior surface 14 of beverage kettle 10 near opening 18. Further, in at least one embodiment, back cover 44 is coupled to interior surface 14 slightly above opening 18. In other cases, however, interior surface 14 may be integrally formed with side portions 48 or front cover 42 such that interior surface 14 functions as a back cover for flow restrictor assembly structure 41. In still other cases, back cover 44 may include an aperture (not shown) co-located with opening 18.

Figure 4A:
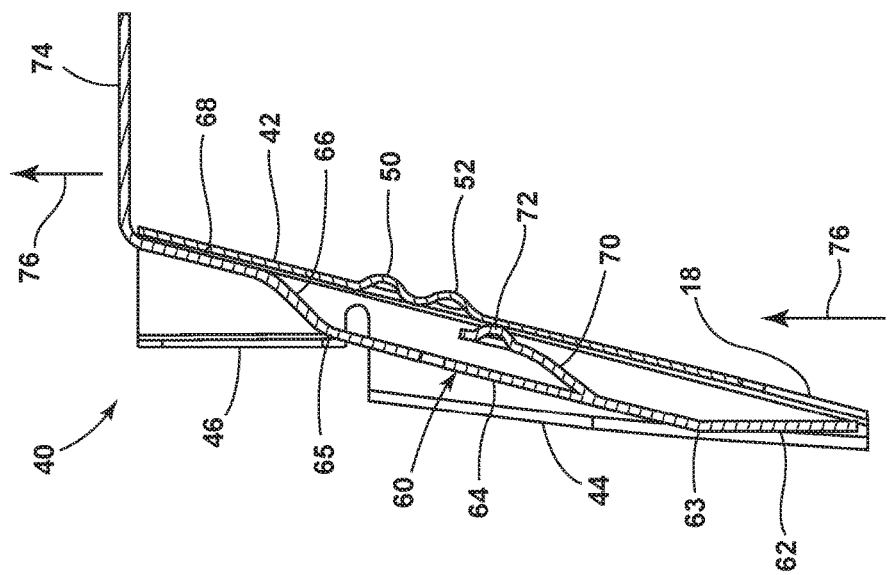
FIGS. 4A-4C depict side cross-sectional views of the flow restrictor assembly of FIG. 2, taken along line IV.

According to the illustrated embodiment, valve member 60 may comprise a flat elongate member generally vertically disposed within flow restrictor assembly structure 41. Referring to FIG. 4A, a cross-sectional view of flow restrictor assembly 40 depicts a cross-section of valve member 60. As shown in FIG. 4A, valve member 60 includes a bottom portion 62, which is operable to block or partially block opening 18. Valve member 60 further includes a middle portion 64 that is slightly inclined horizontally at a bend 63 with respect to bottom portion 62. Middle portion 64 extends vertically to an inclined top portion 68 which is also slightly inclined horizontally at a bend 65 with respect to middle portion 64 and an intermediate portion 66, against top back cover portion 46.

Valve member 60 may further include a biased arm 70 extending outwardly, and configured to provide tension against flow restrictor assembly structure 41 to hold valve member 60 in one of several varying positions. In some cases, biased arm 70 may include a separate, flat elongate member extending from any of bottom portion 62, middle portion 64, intermediate portion 66, or top portion 68. In at least one case, biased arm 70 may be configured as a separate, flat elongate member, inclined outwardly from middle portion 64, with a protrusion 72 disposed on an end thereof. As described in more detail below, protrusion 72 may be configured to engage with and rest in one of a plurality of detents disposed on front cover 42, such as detent 50 or detent 52.

Figure 4C:
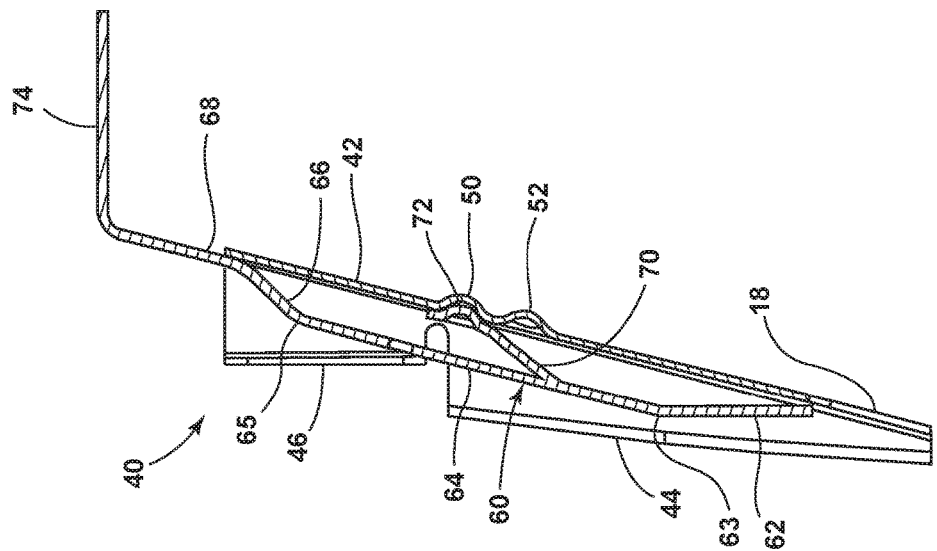
Figure 4B:
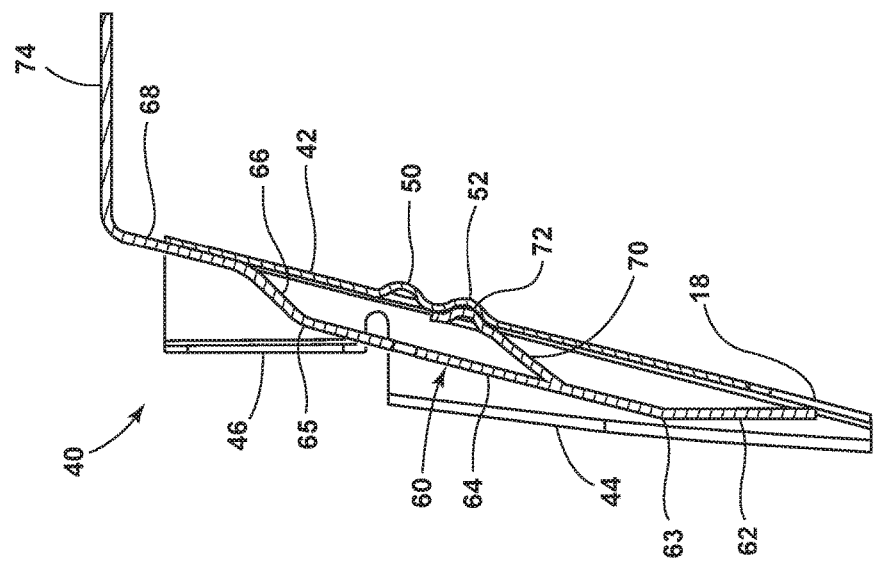

Top portion 68 of valve member 60 may include a handle 74, which may extend generally horizontally out of the flow restrictor assembly structure 41, such that a user may move valve member 60 up and down within the flow restrictor assembly structure 41. Thus, according to at least one embodiment, valve member 60 may be positioned at varying heights to block a variable portion of opening 18. In particular, when engaged, handle 74 may be operable to position protrusion 72 in a low position associated with detent 52, depicted in FIG. 4B, or in a higher position associated with detent 50, shown in FIG. 4C, to adjust the flow rate out of opening 18. Additionally, valve member 60 may be positioned to block all or a substantial portion of opening 54 when positioned in a lowest position (FIG. 4A), thereby significantly restricting the flow of liquid out of opening 18. It will be understood, however, that the variable positions depicted in FIGS. 4A-4C are only exemplary, and more or fewer positions may be provided, for example more or fewer detents may be provided in front cover 42, to provide even greater variability in restricting liquid flow out of opening 18.

Valve member 60 may be formed from a rigidly flexible material such that, in operation, bend 63 and bend 65 of valve member 60 create a horizontally applied tension on arm 70, holding protrusion 72 in a selected position, such as in detent 50 or detent 52. More specifically, as shown in FIGS. 4A-4C, bend 63 and bend 65 are configured to press against fixed back cover 44 and top back cover portion 46, respectively, to provide an opposite directional force on arm 70. For example, if a user raises handle 74 in a vertical direction 76 to move protrusion 72 into detent 52, bottom portion 62 of valve member 60 is also raised. In other words, the movement of valve member 60 in a substantially vertical direction 76 with respect to flow restrictor assembly structure 41 moves bottom portion 62 in substantially vertical direction 76 to partially uncover opening 18, causing a partially restricted flow of liquid. The further movement of valve member 60 in a substantially vertical direction 76 such that protrusion 72 rests in detent 50 would further uncover opening 18, allowing a greater flow of liquid through opening 18.

As discussed above, flow restrictor assembly 40, including valve member 60 and flow restrictor assembly structure 41, as well as other embodiments discussed herein, may be formed from any material selected for rigidity and flexibility under tension, as well as for being resistant to a variety of temperatures, as would be contemplated by a skilled artisan. For example, portions of flow restrictor assembly may be formed from a rigid plastic material or a metal, or any other material having similar properties. In at least one case, both flow restrictor assembly structure 41 and valve member 60 may be formed from a sheet metal. In other cases, however, the flow restrictor assembly structure 41 and valve member 60 may be formed from different materials. Accordingly, it will be understood by one having ordinary skill in the art that construction of the described disclosure and other components, including any of the illustrated embodiments, is not limited to any specific material or method of manufacture, and may be made according to materials, techniques and methods understood in the art.

It should also be noted that a flow restrictor assembly as contemplated herein may be varied in configuration and still fall within the spirit and scope of the present disclosure. For example, a flow restrictor assembly may include more or fewer detents, thereby providing additional or fewer options for restricting flow. In addition, a flow restrictor assembly may be operatively controlled in a variety of ways, such as by an electro-mechanical switch or by an external member that is operably coupled to a flow restrictor assembly. Those skilled in the art will appreciate the breadth of options contemplated herein, and falling within the scope of the present disclosure.

FIG. 5A-6C depict another embodiment of a flow restrictor assembly 140, according to aspects of the present disclosure. Similar to the embodiment of FIGS. 1-4C, flow restrictor assembly 140 may be disposed in a beverage kettle 110. Beverage kettle 110 may generally include similar features as discussed above with respect to beverage kettle 10 of FIG. 1. In particular, beverage kettle 110 may generally include an external surface 112 and an interior surface 114 defining a cavity 116 for holding a liquid, as would be known in the art. The beverage kettle 110 may further include an opening 118 having a spout (not shown) disposed thereon for dispensing liquid from the cavity 116. Further, cavity 116 may include a top opening 122 and a lid assembly 124 for closing and/or accessing cavity 116. In some embodiments, lid assembly 124 may further include a thermometer 126 integrated therewith for measuring the temperature of a liquid contained in beverage kettle 110, as shown in FIG. 6A. However, in other cases, lid assembly 124 may be provided without a thermometer, or may include other integral devices or instruments. Further, similar to embodiments discussed above, beverage kettle 110 may be coupled to a heating and/or cooling element to heat or cool a liquid contained therein, as would be contemplated by a skilled artisan.

Flow restrictor assembly 140 may be disposed in cavity 116 to restrict the flow of liquid out of opening 118. As depicted in FIGS. 5A-6C, according to another illustrated embodiment, flow restrictor assembly 140 may include a first portion, or a flow restrictor assembly structure 150, and a second portion, or a valve member 170. As described in more detail below, valve member 170 may be movable between a plurality of positions to restrict the flow of liquid out of opening 118 and ultimately beverage kettle 110.

With reference to FIGS. 5A-6C, flow restrictor assembly structure 150 may include a front cover 152 and a pair of side portions 156. Front cover 152 may further incorporate a biasing assembly 160, configured to engage with valve member 180, as described in more detail below. Flow restrictor assembly structure 150 may be assembled within and attached to an interior surface 114 of beverage kettle 110. In some cases, flow restrictor assembly structure 150 may be mechanically fastened to an interior surface 114 via screws or other similar mechanical fasteners; however, in other cases one or more portions of flow restrictor assembly structure 150 may be attached via adhesive or welding. In at least one case, side portions 156 may include top side flanges 154 and bottom side flanges 158 that are mechanically welded or otherwise adhered to interior surface 114 of beverage kettle 110.

Figure 5A:
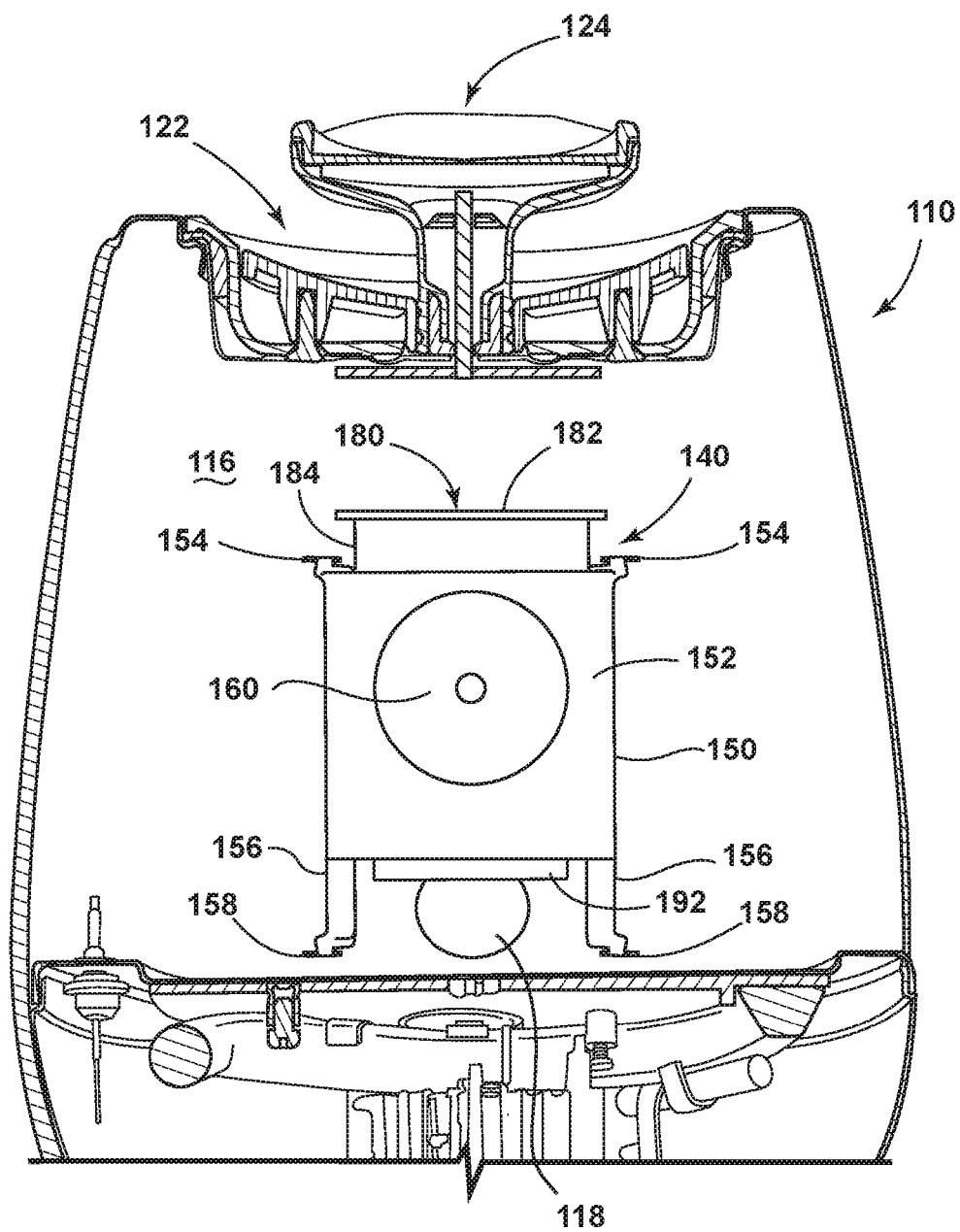
FIG. 5A depicts a cross-sectional view of a beverage kettle having a flow restrictor assembly, according to another embodiment of the present disclosure.
Figure 5B:
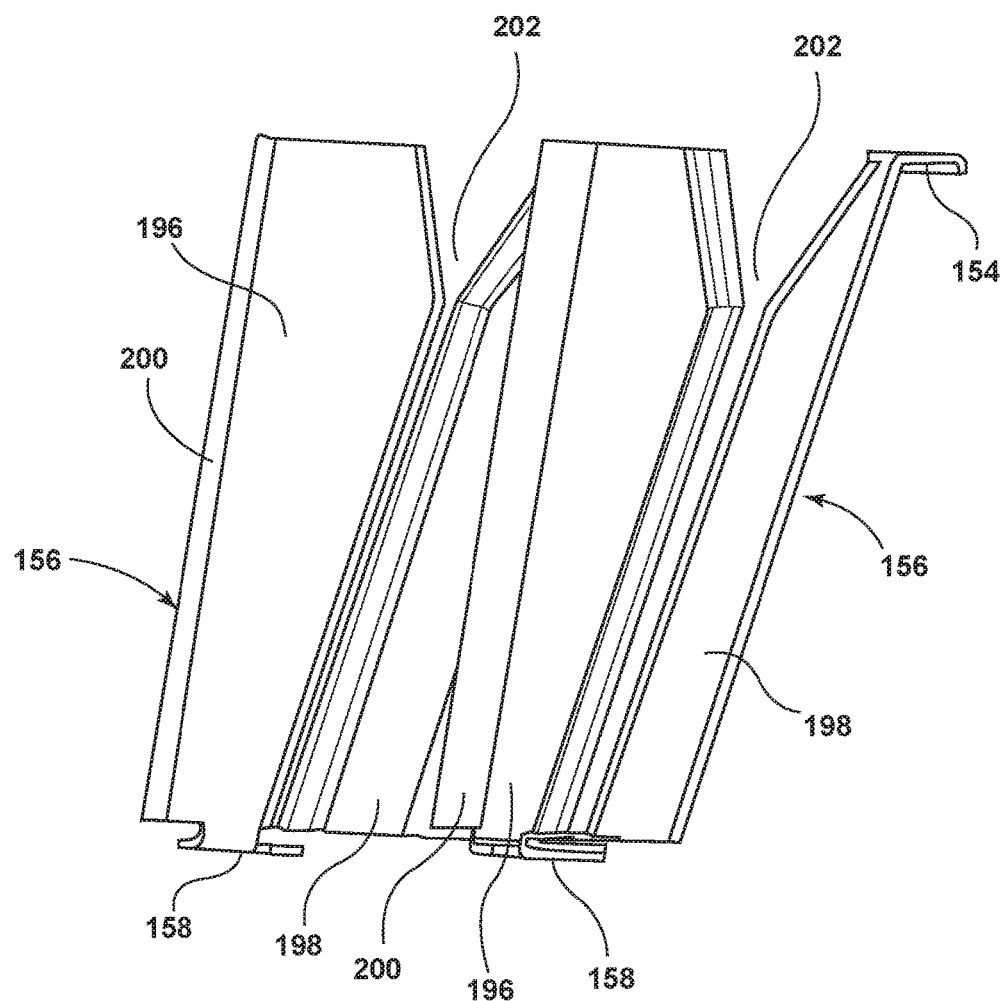
FIG. 5B depicts a rear view of a portion of a flow restrictor assembly, according to the embodiment depicted in FIG. 5A.
Figure 6A:
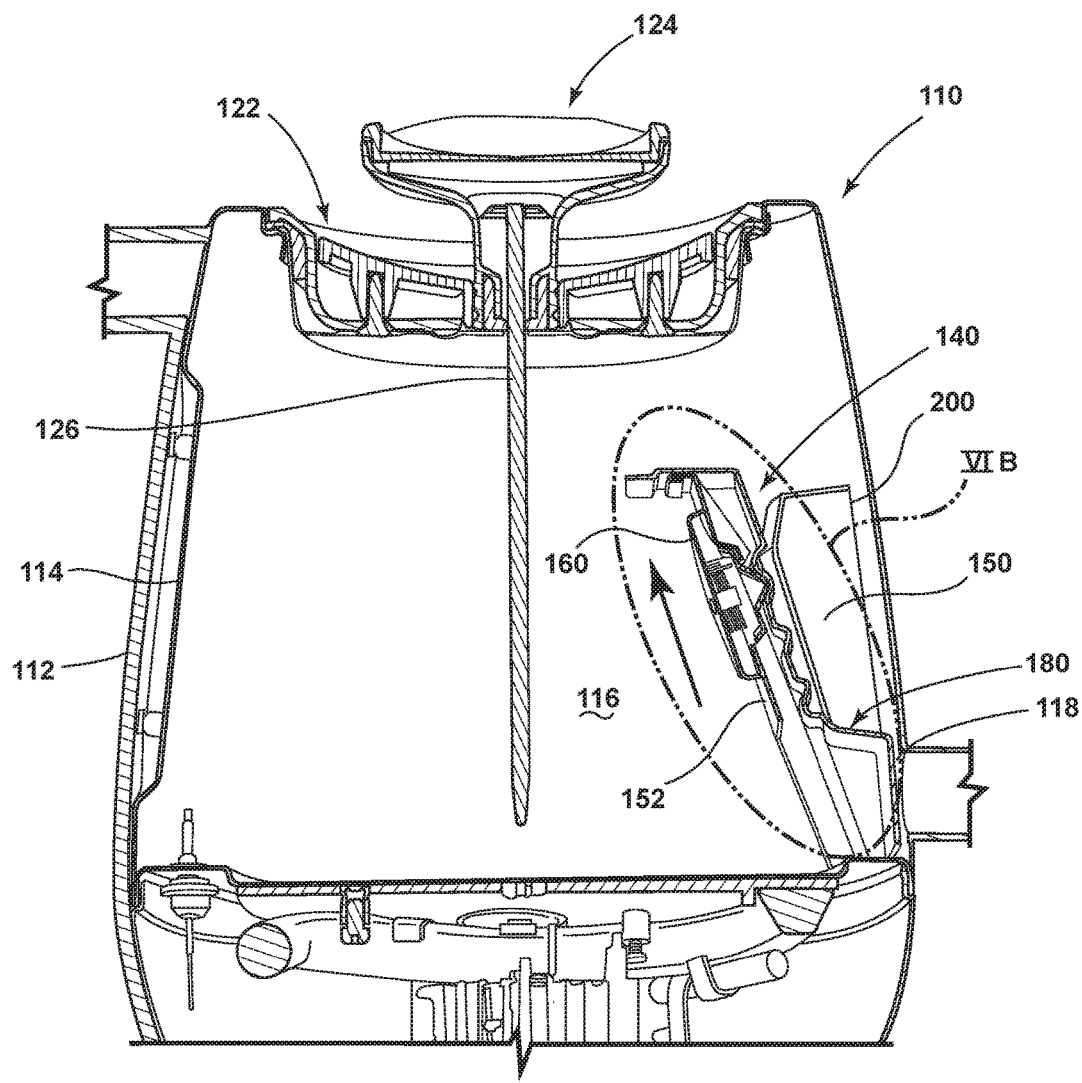
FIG. 6A depicts another cross-sectional view of a beverage kettle having a flow restrictor assembly, according to the embodiment of the present disclosure.

Referring to FIG. 5B, the pair of side portions 156 may include a pair of back portions 196 and a pair of front portions 198. Together, back portions 196 and front portions 198 may define a valve member channel 202 for receiving valve member 180. Back portions 196 may be attached to interior surface 114 of beverage kettle 110 along an interior cavity attachment surface 200. Interior cavity attachment surface 200 may be affixed to an interior surface 114 of beverage kettle 110, as depicted in FIG. 6A.

Figure 6B:
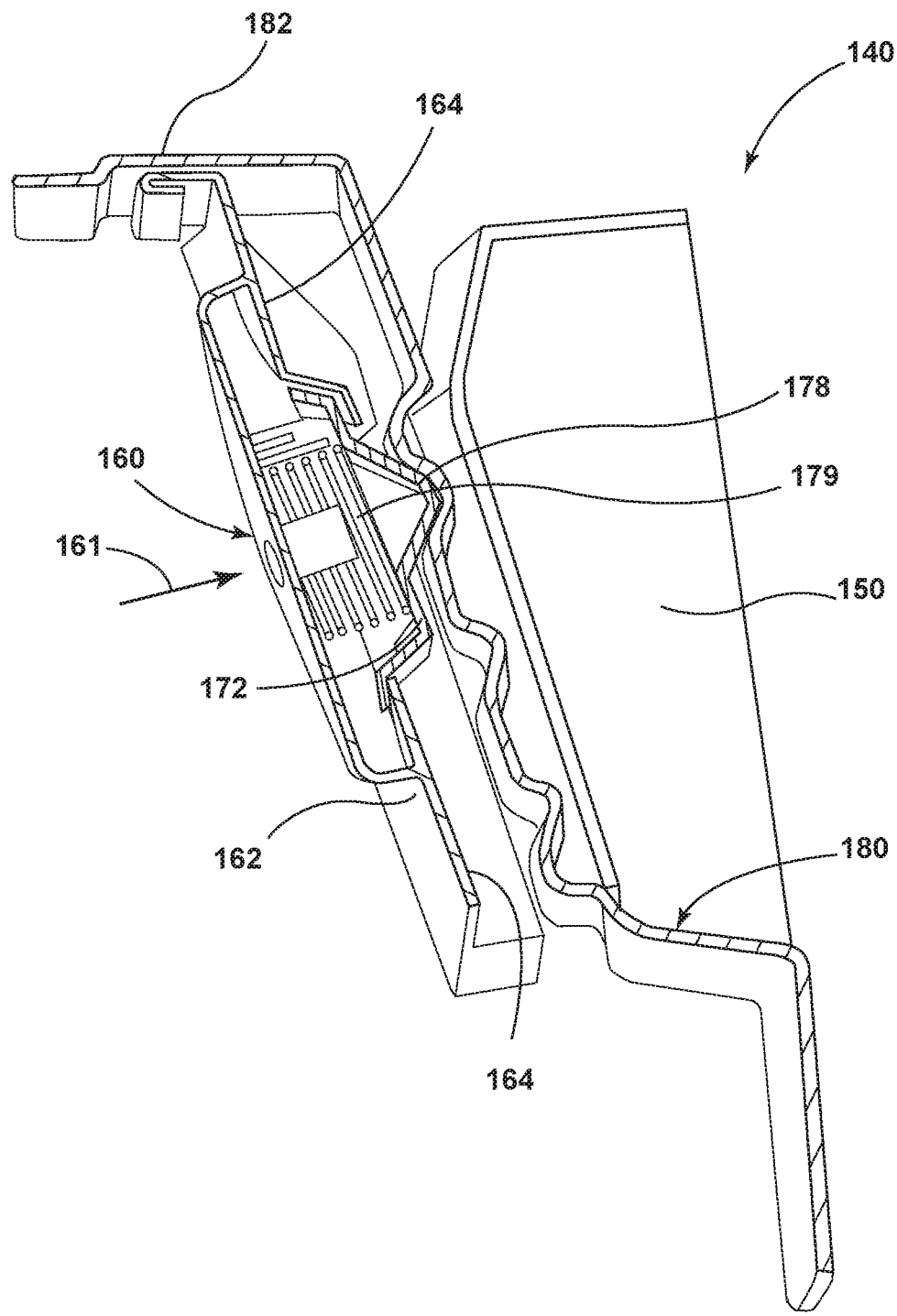
FIG. 6B depicts an enlarged cross-sectional view of some components of the flow restrictor assembly according to the embodiment depicted in FIG. 6A.
Figure 6C:
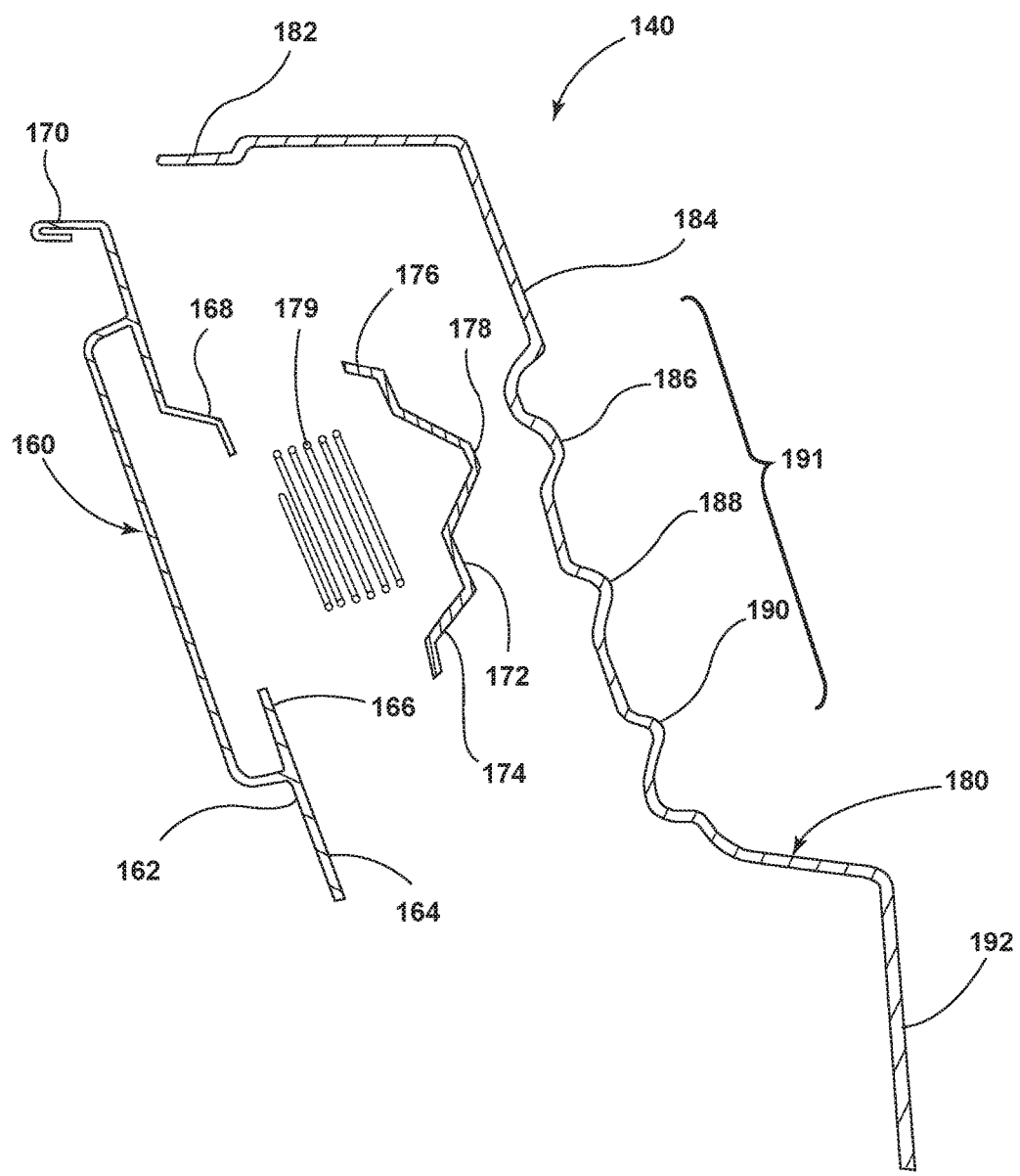
FIG. 6C depicts an enlarged, exploded view of certain components of the flow restrictor assembly depicted in FIG. 6B.

Referring to FIGS. 6B and 6C, portions of a flow restrictor assembly 140 are depicted. In particular, flow restrictor assembly 140 may include a valve member 180 that is configured to be positioned at different heights within beverage kettle 110 to restrict the flow of liquid out of opening 118. In at least one embodiment, valve member 180 includes a handle portion 182 for moving valve member 180 up and down with respect to opening 118, an extension portion 184, and a restriction portion 192. In some cases, extension portion 184 may include a plurality of mechanisms to hold valve member 180 in a variable height position with respect to opening 118. In some cases this may include a knob, hole, flange, or other mechanical feature that may be used for biasing against or otherwise holding the valve member in place. In at least one case valve member 180 includes a plurality of detents, high detent 186, middle detent 188, and low detent 190, collectively detents 191, for engaging with a protrusion 178 on biasing assembly 160.

Flow restrictor assembly 140 may also include a biasing structure to engage with valve member 180 to hold valve member 180 in position with respect to opening 118. Biasing structure may be integrated with the entire flow restrictor assembly or may be a separate structure configured to engage with valve member 180. In at least one case biasing assembly 160 is integrated with flow restrictor assembly structure 150 as shown in the illustrated embodiment depicted in FIGS. 6A-6C. Biasing assembly 160 may include first side 162 facing cavity 116, and a second side 164 facing valve member 180. Second side 164 may be configured to interact with a protrusion member 172 having a protrusion 178 for engaging with detents 191.

According to the illustrated embodiment, protrusion member 172 may include an extended edge member 174 and a second edge member 176. Biasing assembly 160 may include a first flange 166 and a second flange 168, configured to receive and hold extended edge member 174 and second edge member 176, respectively, of protrusion member 172. In addition, a biasing spring 179 or other biasing mechanism may be disposed between a first side 162 of biasing assembly 160 and protrusion member 172 such that protrusion member 172 presses against first flange 166 and second flange 168. Accordingly, biasing spring 179 may create a tension applied in a direction 161 that is perpendicular to protrusion 178 and one of plurality of detents 191 to hold protrusion 178 in one of the plurality of detents 191.

Accordingly, in operation, valve member 180 may be moved vertically in valve member channel 202 such that protrusion 178 rests in either high detent 186, middle detent 188, or low detent 190 resulting in restriction portion 192 covering all of, a portion of, or none of opening 118, respectively.

Figure 7:
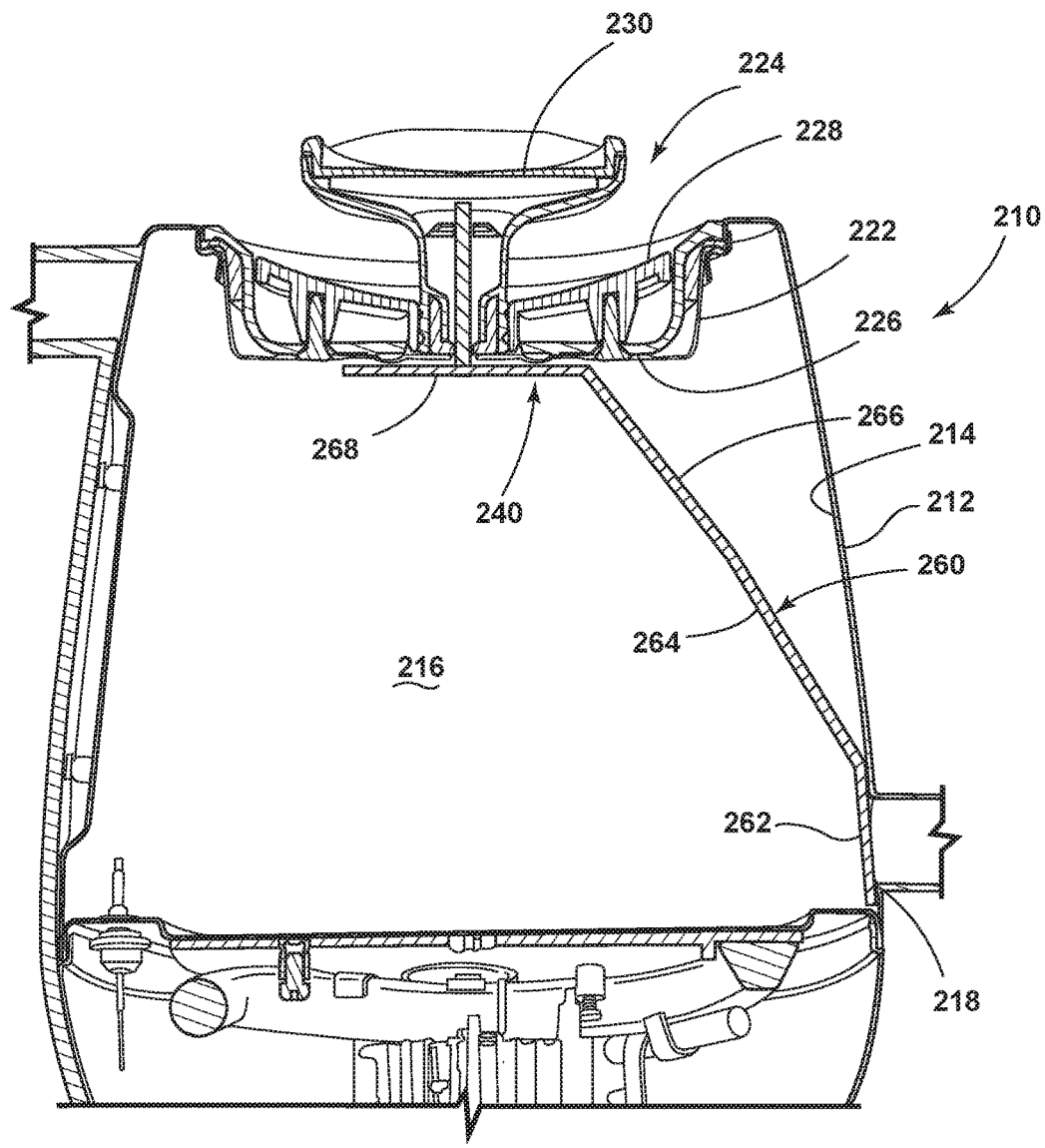
FIG. 7 depicts a schematic cross-sectional view of a beverage kettle having a flow restrictor assembly, according to another embodiment of the present disclosure.
Figure 8A:
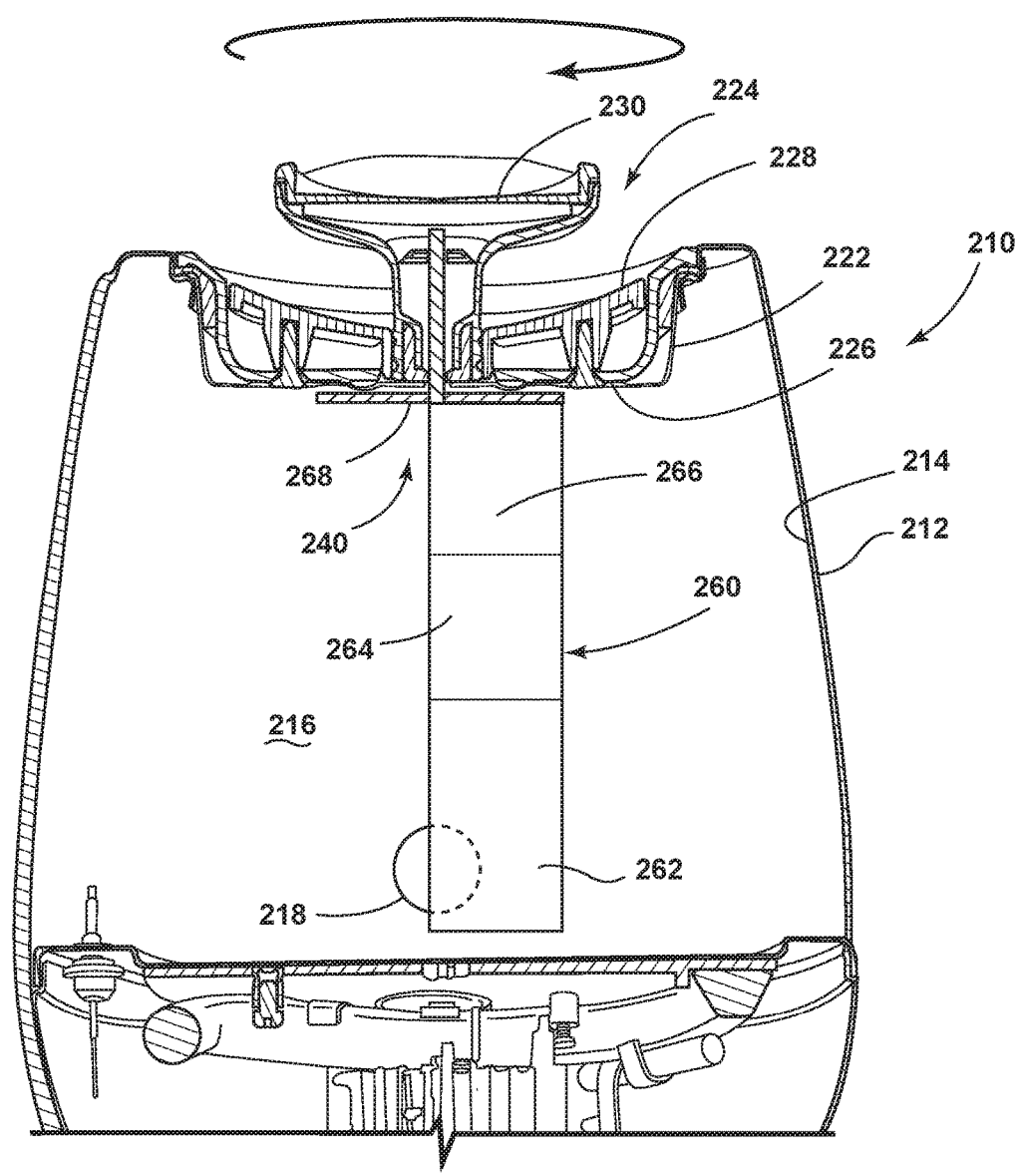
FIGS. 8A-8B depict schematic front views of the beverage kettle and flow restrictor assembly of FIG. 7.
Figure 8B:
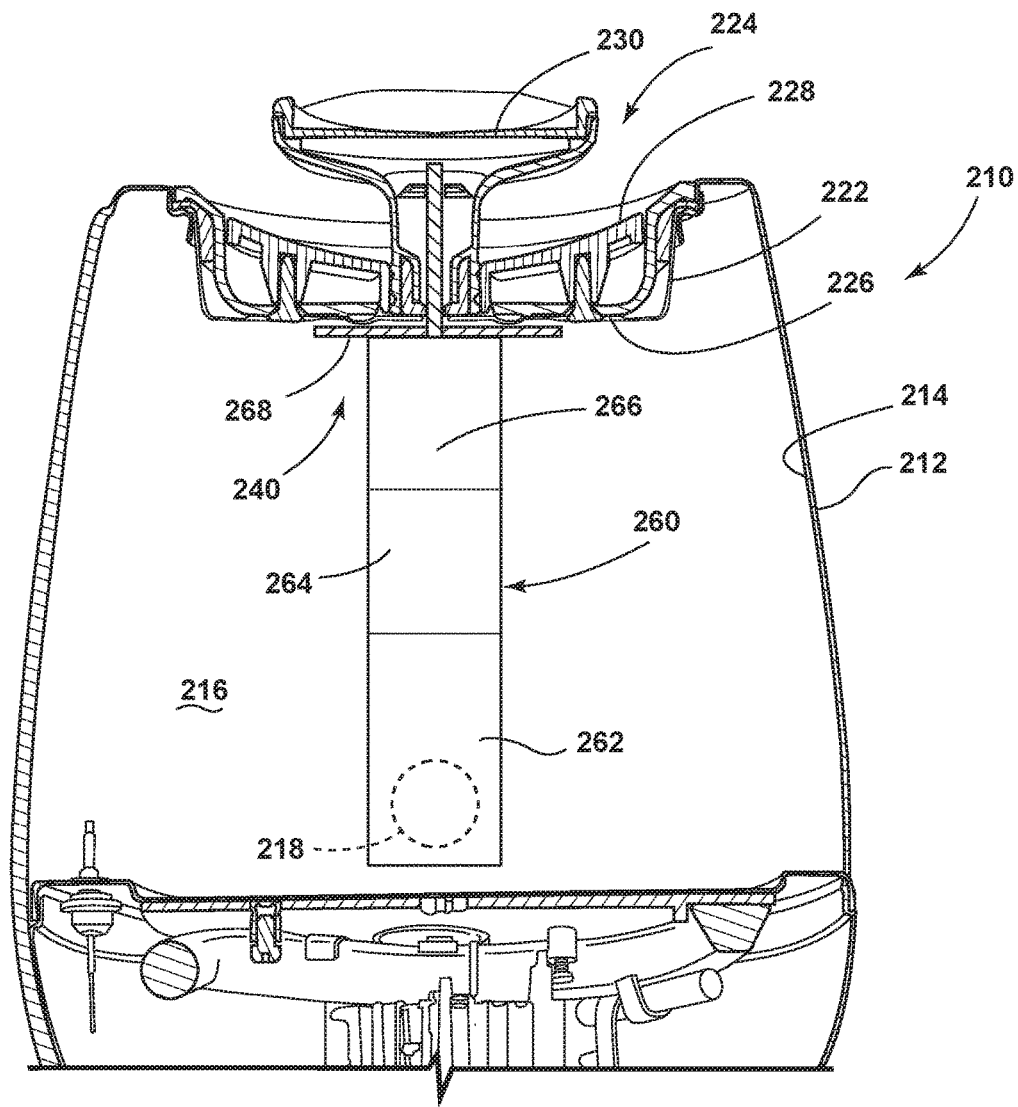
Figure 9:
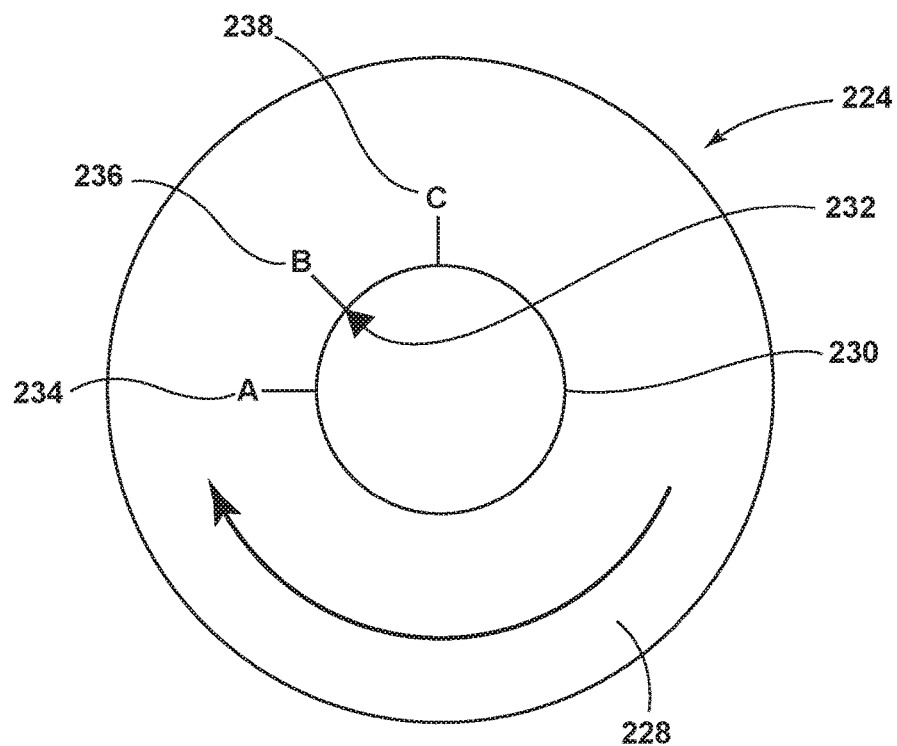
FIG. 9 depicts a top plan view of a lid for the beverage kettle of FIG. 6.
Figure 10:
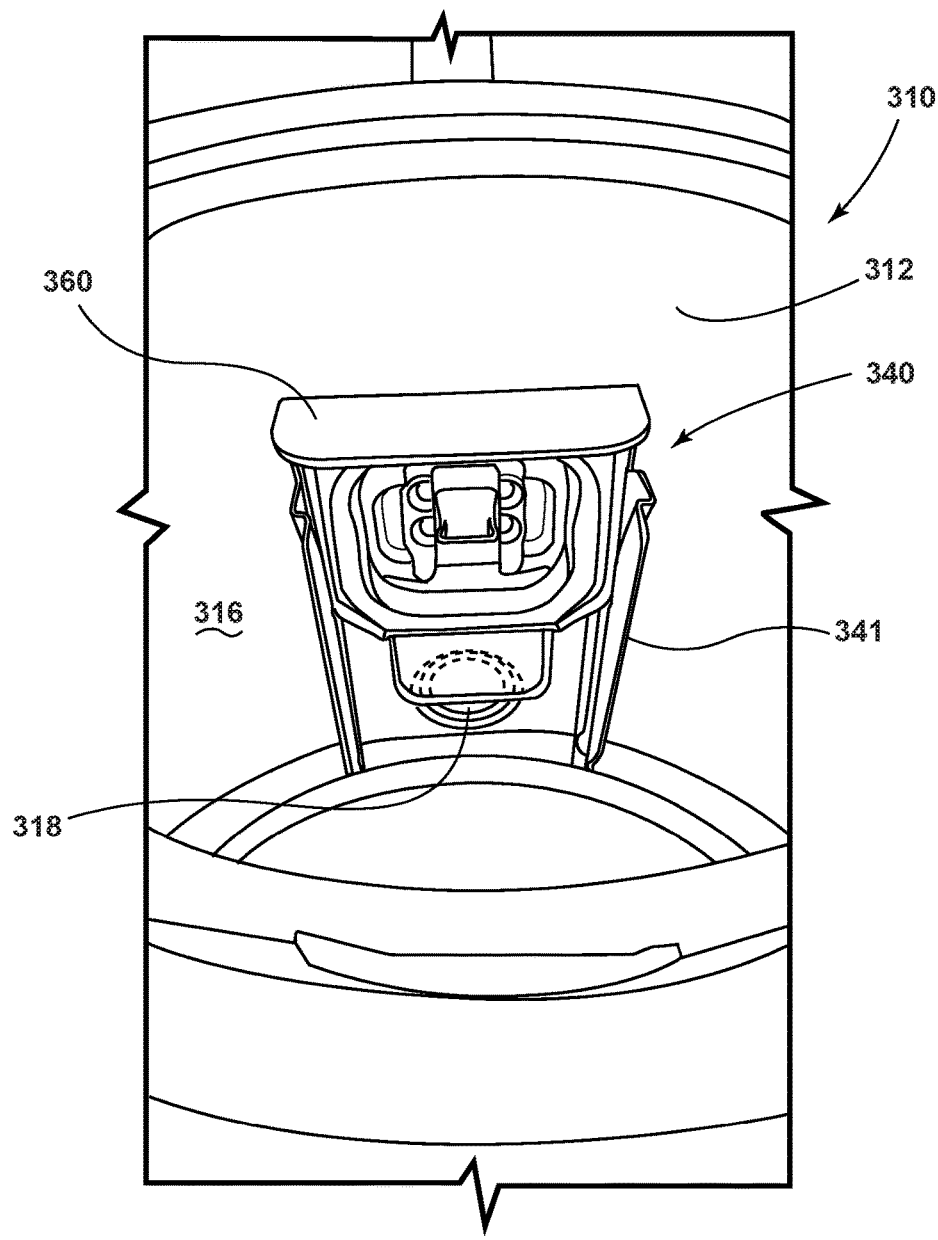
FIG. 10 depicts a schematic cross-sectional view of a beverage kettle having a flow restrictor assembly, according to yet another embodiment of the present disclosure.
Figure 11:
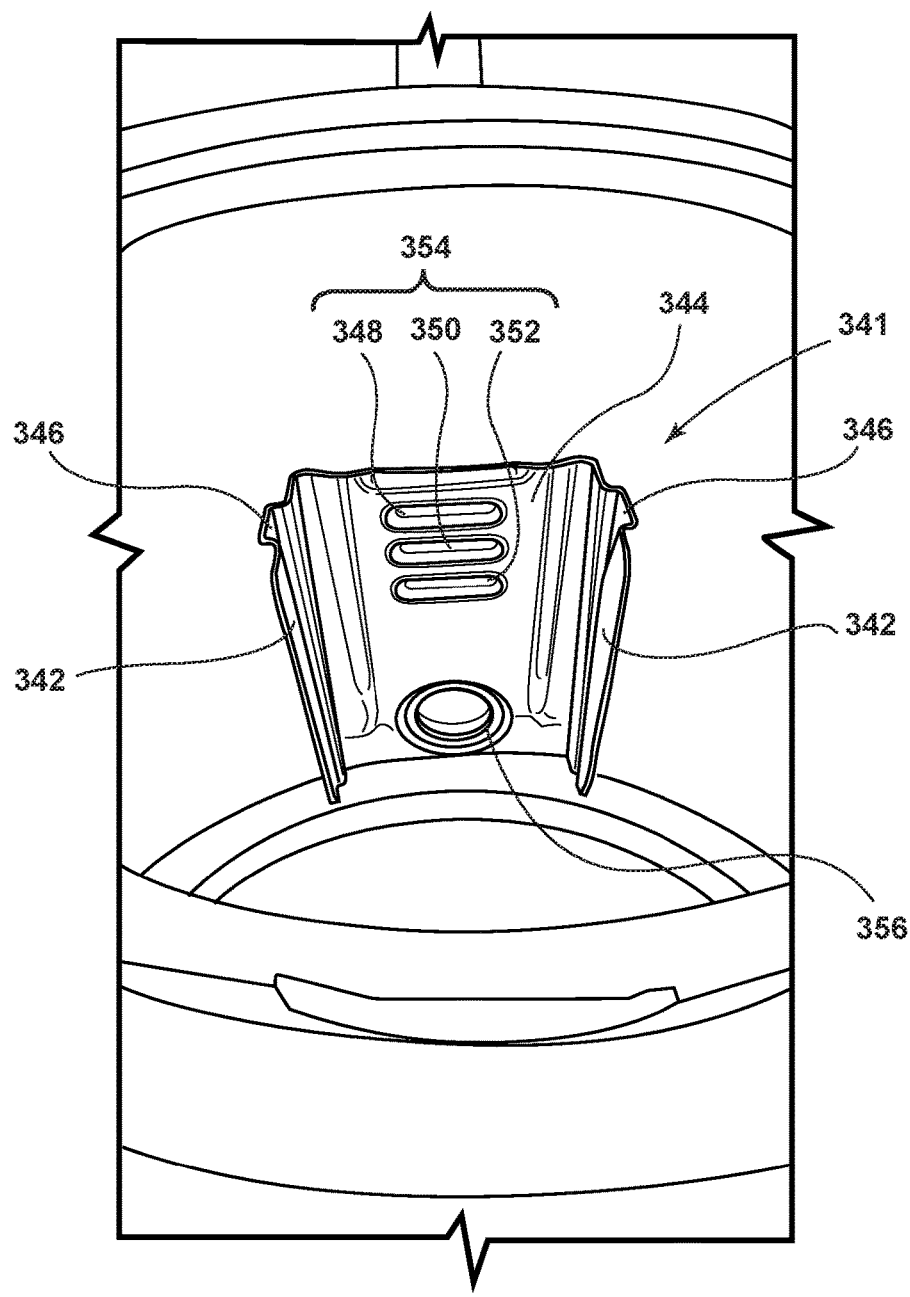
FIG. 11 depicts a schematic view of a portion of the flow restrictor assembly depicted in FIG. 10.

FIGS. 7-9 refer to yet another embodiment of a flow restrictor assembly 240, according to aspects of the present disclosure. Similar to the embodiments discussed above, at least a portion of flow restrictor assembly 240 may be disposed in a beverage kettle 210. Beverage kettle 210 may generally include similar features as discussed above with respect to beverage kettle 10 of FIG. 1. In particular, beverage kettle 210 may generally include an external surface 212 and an interior surface 214 defining a cavity 216 for holding a liquid, as would be known in the art. The beverage kettle 210 may further include an opening 218 having a spout (not shown) disposed thereon for dispensing liquid from the cavity 216. Further, cavity 216 may include a top opening 222 and a lid assembly 224 for closing and/or accessing cavity 216.

According to the embodiment of FIGS. 7-9, flow restrictor assembly 240 may include a valve member 260 that is movable between variable positions within cavity 216 relative to opening 218 to block a portion of opening 218, thereby controlling the flow of liquid out of cavity 216. In some cases, flow restrictor assembly 240 may further include a knob 230 operably coupled to valve member 260, accessible as part of lid assembly 224. As discussed in more detail below, the rotation of knob 230 with respect to a top surface 228 of lid assembly 224 causes valve member 260 to rotate within cavity 116. Accordingly, the rotation of valve member 260 within cavity 216 selectively covers or uncovers portions of opening 218 to control the flow of liquid from opening 218.

Referring to FIGS. 7-8B, according to aspects described herein, valve member 260 comprises an elongate member coupled to knob 230, and extending downward from a bottom surface 226 of lid assembly. As shown in the cross-sectional view of FIG. 7, valve member 260 may further include multiple flat portions connected at varying angles with respect to each other such that an outer surface 266 of a bottom portion 262 of valve member 260 may align with, or lay flush with, a side wall of the interior surface 214 of beverage kettle 210. Moving upward from bottom portion 262, in some cases, a middle portion 264 may be slightly angled toward a center of lid assembly 224. In other cases, however, depending on the configuration of the beverage kettle, middle portion 264 may have no angle and may be shaped to be flush with an interior surface all the way up the lid assembly. On the lid assembly, a top portion 268 may be operably coupled to a knob 230 accessible on the top surface 228 of a lid assembly 224.

FIG. 9 depicts one embodiment of a top surface 228 of lid assembly 224. Knob 230 may serve as a dial, having marker 232 to rotate between position "A" 234, position "B" 236 and position "C" 238, effectively rotating valve member 260 across opening 218 in varying degrees. Accordingly, in operation, when knob 230 is rotated into position "A" 234, valve member 260 may be in a closed position as depicted in FIG. 8B, thereby fully restricting the flow of liquid through opening 218. When knob 230 is rotated into position "B" 236, valve member 260 may be in a partially open position as depicted in FIG. 8A, thereby partially restricting the flow of liquid through opening 218. When knob 230 is rotated into position "C" 238, valve member 260 may be in a fully open position (not shown), thereby not restricting the flow of liquid through opening 218.

FIGS. 10-14 refer to yet another embodiment of a flow restrictor assembly 340, according to aspects of the present disclosure. Similar to the embodiments discussed above, flow restrictor assembly 340 may be disposed in a beverage kettle 310. While only partially depicted in FIGS. 10 and 11, beverage kettle 310 may generally include similar features as discussed above with respect to beverage kettle 10 of FIG. 1. In particular, beverage kettle 310 may generally include an external surface (not shown) and an interior surface 312 defining a cavity 316 for holding a liquid, as would be known in the art. The beverage kettle 310 may further include an opening 318 having a spout (not shown) disposed thereon for dispensing liquid from the cavity 316. Further, as would be known in the art, beverage kettle may include a top opening and a lid assembly for closing and/or accessing cavity 316. According to aspects described herein, beverage kettle 310 may also include flow restrictor assembly 340 disposed within cavity 316. Similar to previously described embodiments, flow restrictor assembly 340 may include a valve member 360 that is movable between variable positions relative to opening 318, thereby configured to restrict or limit the flow of liquid out of opening 318.

According to the illustrated embodiment, flow restrictor assembly 340 may include a valve member 360 disposed within a flow restrictor assembly structure 341, that is movable with respect to the flow restrictor assembly structure 341. Accordingly, as described in more detail below, the position of valve member 360 with respect to flow restrictor assembly structure 341 may be adjusted to provide varying levels of flow restriction to opening 318.

In at least one embodiment, flow restrictor assembly structure 341 may include a back portion 344 and side portions 342. In some cases, back portion 344 may be integrally formed with side portions 342, and a channel 346 may be defined in side portions 342. Further, in at least one embodiment, back portion 344 is coupled to interior surface 312 over opening 318, and an aperture 356 is defined in back portion 344 to allow liquid to pass. In other cases, however, interior surface 312 may be integrally formed with flow restrictor assembly structure 341 such that interior surface 312 functions as a back portion for flow restrictor assembly structure 341.

FIGS. 12-14 depict a front view, rear view, and side view, respectively, of valve member 360. According to the illustrated embodiment, valve member 360 includes an integrally formed member generally vertically disposed within flow restrictor assembly structure 341. Specifically, valve member 360 includes a bottom portion 366, which is operable to block or partially block opening 318. Valve member 360 further includes a middle portion 364, inclined away from bottom portion 366 via connecting portion 365 such that surface 367 of middle portion 364 is offset from bottom portion 366. Middle portion 364 also extends to a top portion, or handle 362, inclined substantially perpendicularly from surface 367 of middle portion 364.

Referring to FIG. 14, a surface of middle portion 364 may include one or more levels or surfaces, including surface 367, surface 368 and surface 370. In at least one case, surface 368 may be raised with respect to surface 367, and surface 370 may be raised with respect to surface 368. Accordingly, since surface 367 of middle portion 364 is offset from bottom portion 366, middle portion 364 may be structured such that surface 370 (and a protrusion 372) aligns with, or resides in substantially the same plane as bottom portion 366.

Valve member 360 may further include a biased member extending from middle portion 364. The biased member may be configured to engage with flow restrictor assembly structure 341 and to hold valve member 360 in one of several positions with respect to opening 318. In some cases, the biased member may be separately attached to valve member 360, and in other cases, the biased member may be integrally formed. In at least one embodiment, a biased arm 374 is formed as a cut-out flange or extension from a central portion of middle portion 364. The biased arm may extend from surface 368, and include a projection, i.e., protrusion 372, to interact with flow restrictor assembly structure 341. As described in more detail below, protrusion 372 may be configured to engage with and rest in one of detent 348, detent 350 or detent 352, collectively detents 354, to adjust the position of bottom portion 366 with respect to opening 318.

In operation, valve member 360 may be positioned in channels 346 of flow restrictor assembly structure 341, and handle 362 may be operable to move valve member 360 in a vertical direction within the flow restrictor assembly structure 341. Thus, according to at least one embodiment, valve member 360 may be positioned at varying heights to block a variable portion of opening 318. In particular, when engaged, handle 362 may be operable to position protrusion 372 in a low position associated with detent 352, or in higher positions, associated with detents 350 and 348, respectively, to adjust the flow rate out of opening 318. It will be understood, however, that the positions associated with detents 354 are only exemplary, and more or fewer detents, or other restriction mechanisms, may be provided to adjust the position of valve member 360.

Similar to other embodiments, valve member 360 may be formed from any rigidly-flexible material known in the art. In particular, the properties of valve member 360 may be such that, in operation, when valve member is situated in channels 346 and bottom portion 366 is pressed against opening 318, biased arm 374 is rigid enough to create a horizontally applied tension, holding protrusion 372 in a selected position, such as in one of detents 354. Additionally, however, valve member 360 must be flexible enough such that biased arm 374 can flex inward, and then spring back into an adjacent detent, when a user moves the position of valve member 360.

Flow restrictor assembly 340, including valve member 360 and flow restrictor assembly structure 341, may be formed from any material selected for rigidity and flexibility under tension, as well as for being resistant to a variety of temperatures, as would be contemplated by a skilled artisan. For example, flow restrictor assembly 340 may be stamped, molded or otherwise formed from a rigid plastic material or a metal, or any other material having similar properties. Again, it will be understood by one having ordinary skill in the art that construction of the described disclosure and other components is not limited to any specific material. Other exemplary embodiments of the disclosure disclosed herein may be formed from a wide variety of materials, unless described otherwise herein.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily envision structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

The invention claimed is:

1. A flow restrictor assembly for a beverage kettle, wherein the beverage kettle defines a cavity for holding a liquid and includes an opening for dispensing liquid from the cavity, the flow restrictor assembly comprising:
- a valve member positioned inside the cavity;
- a handle operably coupled with the valve member to selectively position the valve member in one of a plurality of positions with respect to the opening, wherein the plurality of positions comprise a first position and a second position;
- a biasing member that selectively retains the valve member in one of the plurality of positions at a time; and wherein,
- the valve member covers at least a portion of the opening in the first position such that flow of liquid out of the opening is limited.

2. The flow restrictor assembly of claim 1, wherein:
the plurality of positions further comprises a third position;
the handle is operably coupled with the valve member to selectively position the valve member in the third position; and
the biasing member retains the valve member in the third position.

3. The flow restrictor assembly of claim 1, further comprising:
a flow restrictor assembly structure that supports the valve member.

4. The flow restrictor assembly of claim 3, wherein:
the valve member is disposed within the flow restrictor assembly structure and a location of the valve member relative to the flow restrictor assembly is adjustable to provide varying levels of liquid flow restriction to the opening.

5. The flow restrictor assembly of claim 3, wherein:
the biasing member comprises a protrusion;
the flow restrictor assembly structure comprises at least one detent; and
the protrusion is configured to engage with the at least one detent when the valve member is in the first position.

6. The flow restrictor assembly of claim 3, wherein:
the valve member is disposed within the flow restrictor assembly structure and comprises at least one detent;
the biasing member comprises a spring coupled to a protrusion and is integrally formed with the flow restrictor assembly structure; and
the protrusion is configured to engage with at least one detent when the valve member is in the first position.

7. The flow restrictor assembly of claim 6, wherein:
the flow restrictor assembly structure further comprises a first side portion and a second side portion, the first side portion defining a first channel and the second side portion defining a second channel; and
the valve member is slidably engaged within the first channel and the second channel.

8. The flow restrictor assembly of claim 3, wherein:
the valve member is slidably engaged with the flow restrictor assembly structure.

9. The flow restrictor assembly of claim 1, wherein:
the valve member, the handle, and the biasing member are integrally formed; and
the biasing member comprises a biased arm inclined from the valve member.

10. The flow restrictor assembly of claim 1, wherein:
the valve member and the handle are integrally formed;
the valve member comprises at least one detent; and
the biasing member comprises a spring coupled to a protrusion, wherein the protrusion is configured to engage with at least one detent when the valve member is in the first position.

11. A beverage kettle comprising:
a cavity for holding a liquid, the cavity having a bottom surface, a side wall and a top opening;
a spout for dispensing liquid from the cavity, the spout disposed at an opening in the side wall, and the spout being vertically positioned in a lower half of the side wall; and
a flow restrictor assembly, the flow restrictor assembly comprising:
- a valve member positioned inside the cavity;
- a handle operably coupled with the valve member to selectively position the valve member in one of a plurality of positions with respect to the opening in the side wall, wherein the plurality of positions comprises a first position and a second position; wherein,
  - the valve member partially covers the opening in the side wall in the first position; and
  - rotation of the handle causes the valve member to move from the first position to the second position.

12. The beverage kettle of claim 11, wherein:
the plurality of positions further comprises a third position; and
the handle is operably coupled with the valve member to selectively position and retain the valve member in the third position.

13. The beverage kettle of claim 11, further comprising:
a lid assembly for covering an entirety of the top opening, wherein the handle forms a portion of the lid assembly.

14. The beverage kettle of claim 13, wherein the lid assembly further comprises:
a dial for indicating the position of the valve member.

15. The beverage kettle of claim 11, wherein:
the valve member comprises a flat elongate member having a bottom portion, a middle portion, and a top portion.

16. The beverage kettle of claim 15, wherein:
a flat surface of the bottom portion is configured to lay flush with the side wall of the cavity.

17. A flow restrictor assembly for a beverage kettle, wherein the beverage kettle defines a cavity for holding a liquid and includes an opening for dispensing liquid from the cavity, the flow restrictor assembly comprising:
a valve member positioned entirely inside the cavity, the valve member movable between a plurality of positions with respect to the opening, wherein the plurality of positions comprises a first position and a second position;
a flow restrictor assembly structure for supporting the valve member, wherein side portions of the flow restrictor assembly structure each define a channel for engaging side portions of the valve member; and
a biasing arm extending from the valve member that retains the valve member in each of the plurality of positions, wherein the biasing arm retains the valve member in one of the plurality of positions at a time.

18. The flow restrictor assembly of claim 17, wherein:
the biasing arm includes a protrusion;
the flow restrictor assembly structure includes a first detent and a second detent; and the protrusion is configured to engage with the first detent in the first position and to engage with the second detent in the second position.

19. The flow restrictor assembly of claim 17, wherein:
the biasing arm comprises a cut-out flange in a central portion of the valve member.

20. The flow restrictor assembly of claim 17, wherein:
a bottom portion of the valve member is configured to at least partially cover the opening; and
a top portion of the valve member comprises a handle.

\* \* \* \* \*